(12) United States Patent
Du et al.

(10) Patent No.: US 11,860,994 B2
(45) Date of Patent: Jan. 2, 2024

(54) SOFTWARE CONTAINER APPLICATION SECURITY

(71) Applicant: British Telecommunications Public Limited Company, London (GB)

(72) Inventors: Xiaofeng Du, London (GB); Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 324 days.

(21) Appl. No.: 15/733,180

(22) PCT Filed: Dec. 3, 2018

(86) PCT No.: PCT/EP2018/083358
§ 371 (c)(1),
(2) Date: Jun. 4, 2020

(87) PCT Pub. No.: WO2019/110512
PCT Pub. Date: Jun. 13, 2019

(65) Prior Publication Data
US 2020/0387599 A1    Dec. 10, 2020

(30) Foreign Application Priority Data
Dec. 4, 2017   (EP) .................................. 17205250

(51) Int. Cl.
*G06F 21/53* (2013.01)
*G06F 21/55* (2013.01)
(Continued)

(52) U.S. Cl.
CPC .............. *G06F 21/53* (2013.01); *G06F 21/52* (2013.01); *G06F 21/552* (2013.01); *G06N 5/04* (2013.01);
(Continued)

(58) Field of Classification Search
CPC ..... H04L 63/1425; G06F 21/52; G06F 21/53; G06F 21/552; G06F 9/455;
(Continued)

(56) References Cited

U.S. PATENT DOCUMENTS 10,769,292 B2    9/2020  Daniel et al.
10,951,651 B1 *  3/2021  Golan ................. H04L 63/1425
(Continued)

FOREIGN PATENT DOCUMENTS

CN    102411687 A    4/2012
CN    106951783 A    7/2017
(Continued)

OTHER PUBLICATIONS

Ahmad S., et al., "How do Neurons Operate on Sparse Distributed Representations? A Mathematical Theory of Sparsity, Neurons and Active Dendrites," Retrieved from https://arxiv.org/ftp/arxiv/papers/1601/1601.00720.pdf, 2018, 23 pages.
(Continued)

*Primary Examiner* — D'Arcy Winston Straub
(74) *Attorney, Agent, or Firm* — Pranger Law PC

(57) ABSTRACT

A computer implemented method to detect anomalous behavior of a software container having a software application executing therein, the method including receiving a sparse data representation of each of a: first set of container network traffic records; a first set of application traffic records; and a first set of container resource records, and training an hierarchical temporal memory (HTM) for each first set, wherein the container network traffic records correspond to network traffic communicated with the container, the application traffic records correspond to network traffic communicated with the software application, and the container resource records correspond to the use of computer resources by the container; receiving a sparse data repre-
(Continued)

sentation of each of a: second set of container network traffic records; a second set of application traffic records; and a second set of container resource records; executing the trained HTMs based on each respective second set to determine a degree of recognition of each of the second sets; responsive to an identification of a coincidence of a degree of recognition of each of the second sets being below a threshold degree in each of the HTMs, identifying anomalous behavior of the software container.

8 Claims, 3 Drawing Sheets

(51) Int. Cl.
 *G06F 21/52* (2013.01)
 *G06N 20/00* (2019.01)
 *G06N 5/04* (2023.01)
 *G06F 9/455* (2018.01)
(52) U.S. Cl.
 CPC .............. *G06N 20/00* (2019.01); *G06F 9/455* (2013.01); *G06F 2221/033* (2013.01); *G06F 2221/2149* (2013.01)
(58) Field of Classification Search
 CPC ...... G06F 2221/033; G06F 2221/2149; G06N 20/00; G06N 5/04
 See application file for complete search history.

(56) References Cited

U.S. PATENT DOCUMENTS

| | | | |
|---|---|---|---|
| 11,050,768 | B1 | 6/2021 | Stickle et al. |
| 2009/0282480 | A1 | 11/2009 | Lee et al. |
| 2009/0313193 | A1 | 12/2009 | Hawkins et al. |
| 2012/0005753 | A1 | 1/2012 | Provos et al. |
| 2012/0047581 | A1 | 2/2012 | Banerjee et al. |
| 2013/0054496 | A1* | 2/2013 | Marianetti, II ........ G06N 5/047 706/12 |
| 2015/0127595 | A1 | 5/2015 | Hawkins, II et al. |
| 2016/0028762 | A1* | 1/2016 | Di Pietro ............ H04L 63/1416 726/23 |
| 2016/0321557 | A1* | 11/2016 | Hawkins ................ G06N 20/00 |
| 2017/0053025 | A1 | 2/2017 | De Sousa Webber |
| 2017/0068816 | A1 | 3/2017 | Cavazos |
| 2017/0116412 | A1 | 4/2017 | Stopel et al. |
| 2017/0116415 | A1* | 4/2017 | Stopel ..................... G06F 21/52 |
| 2017/0126718 | A1 | 5/2017 | Baradaran et al. |
| 2018/0020024 | A1 | 1/2018 | Chao et al. |
| 2021/0089650 | A1 | 3/2021 | Daniel et al. |
| 2021/0089670 | A1 | 3/2021 | Daniel et al. |

FOREIGN PATENT DOCUMENTS

| | | |
|---|---|---|
| EP | 1814055 A2 | 8/2007 |
| WO | WO-2017194637 A1 | 11/2017 |

OTHER PUBLICATIONS

Ahmad S., et al., "Properties of Sparse Distributed Representations and their Application to Hierarchical Temporal Memory," retrieved from https://arxiv.org/ftp/arxiv/papers/1503/1503.07469.pdf on Mar. 28, 2018, Numenta, Mar. 24, 2015, 18 pages.
Ahmad S., et al., "Real-Time Anomaly Detection for Streaming Analytics," retrieved from https://arxiv.org/pdf/1607.02480.pdf on Mar. 28, 2018, Numenta, Inc., Jul. 8, 2016, 10 pages.
Antonopoulos A.M., "Mastering Bitcoin, Unlocking Digital Crypto-Currencies," O'Reilly Media, Apr. 2014, 282 pages.
Application and File History for U.S. Appl. No. 16/636,280, filed Feb. 3, 2020, Inventors: El Moussa et al.
Application and File History for U.S. Appl. No. 16/636,282, filed Feb. 3, 2020, Inventors: El Moussa et al.
Assia Y., et al., "Colored Coins Whitepaper," 2015, available at https://docs.google.com/document/d/1AnkP_cVZTCMLIzw4DvsW6M8Q2JC0IIzrTLuoWu2z1BE/, 23 pages.
Berger V., "Anomaly Detection in User Behavior of Websites Using Hierarchical Temporal Memories," May 19, 2017, retrieved from URL http://kth.diva-portal.org/smash/get/diva2:1094877/FULLTEXT01. pdf on Sep. 5, 2017.
Billaudelle S., et al., "Porting HTM Models to the Heidelberg Neuromorphic Computing Platform," Feb. 9, 2016, Cornell University Library, retrieved from https://arxiv.org/pdf/1505.02142. pdf, 9 pages.
Communication pursuant to Article 94(3) EPC for European Application No. 18811033.2, dated Jan. 14, 2022, 4 pages.
Cui Y., et al., "Continuous Online Sequence Learning with an Unsupervised Neural Network Model," Neural Computation, vol. 28, No. 11, Nov. 2016, pp. 2474-2504.
Cui Y., et al., "The HTM Spatial Pooler: A Neocortical Algorithm for Online Sparse Distributed Coding," retrieved from https://www.biorxiv.org/content/biorxiv/early/2017/02/16/085035.full.pdf on Mar. 28, 2018, Numenta Inc., Feb. 3, 2017, 16 pages.
Hawkins J., et al., "Hierarchical Temporal Memory Concepts, Theory, and Terminology," Numenta Inc., 2006, 19 pages.
Hawkins J., et al., "Why Neurons Have Thousands of Synapses, A Theory of Sequence Memory in Neocortex," Frontiers in Neural Circuits, vol. 10, Article 23, Mar. 2016, 13 pages.
Hawkins J, "On Intelligence," How a New Understanding of the Brain Will Lead to the Creation of Truly Intelligent Machines, 2004, Times Books, Jul. 14, 2005, 174 pages.
International Preliminary Report on Patentability for Application No. PCT/EP2018/070631, dated Feb. 13, 2020, 9 pages.
International Preliminary Report on Patentability for Application No. PCT/EP2018/070632, dated Feb. 13, 2020, 10 pages.
International Search Report and Written Opinion for Application No. PCT/EP2018/070631, dated Aug. 17, 2018, 12 pages.
International Search Report and Written Opinion for Application No. PCT/EP2018/070632, dated Aug. 21, 2018, 13 pages.
International Search Report and Written Opinion For PCT Application No. PCT/EP2018/083358, dated Feb. 15, 2019, 11 pages.
Lavin A., et al., "Evaluating Real-Time Anomaly Detection Algorithms—The Numenta Anomaly Benchmark," Retrieved from https://arxiv.org/ftp/arxiv/papers/1510/1510.03336.pdf, Numenta, Inc., Oct. 9, 2015, 8 pages.
Network Working Group, "Hypertext Transfer Protocol—HTTP/1. 1," Jun. 1999, 114 Pages.
Numenta, "Biological and Machine Intelligence (BAMI), A living book that documents Hierarchical Temporal Memory (HTM)," Mar. 8, 2017, 69 pages.
Numenta, "Hierarchical Temporal Memory including HTM Cortical Learning Algorithms," Version 0.2.1, Numenta, Sep. 12, 2011, 68 pages.
Numenta, "The Science of Anomaly Detection," How HTM Enables Anomaly Detection in Streaming Data, Dec. 31, 2015, Retrieved from URL:https://numenta.com/assets/pdf/whitepapers/Numenta%20White%20Paper%20-%20Science%20of%20Anomaly%20Detection. pdf retrieved on Sep. 7, 2017.
Office Action for GB Application No. 17184578.7, dated Sep. 18, 2017, 11 pages.
Office Action for GB Application No. 17184580.3, dated Nov. 3, 2017, 8 pages.
Office Action for GB Application No. 1720174.0, dated May 23, 2018, 6 pages.
Olshausen B.A., et al., "Sparse Coding with an Overcomplete Basis Set: A Strategy Employed by VI?," Pergamon, vol. 37, No. 23, 1997, pp. 3311-3325.
Purdy S., "Encoding Data for HTM Systems," Retrieved from https://arxiv.org/ftp/arxiv/papers/1602/1602.05925.pdf, Numenta, Inc., Feb. 2016, 11 pages.
Rosenfeld M., "Overview of Colored Coins," https://bravenewcoin.com/assets/Whitepapers/Overview-of-Colored-Coins.pdf, Dec. 4, 2012, 13 pages.

(56) References Cited

OTHER PUBLICATIONS

Taylor M., "Sparse Distributed Representations," Numenta, 2017, 3 pages.
Thorpe S.J., "Spike Arrival Times: A Highly Efficient Coding Scheme for Neural Networks," Parallel Processing in Neural Systems and Computers, 1990, pp. 91-94.
Wang, C. et al.; "A Distributed Anomaly Detection System for In-Vehicle Network Using HTM," 2018, vol. 6, pp. 9091-9098.
Wood G., "Ethereum: A Secure Decentralised Generalized Transaction Ledger," EIP-150 Revision, Jun. 4, 2014, pp. 1-32.

* cited by examiner

SOFTWARE CONTAINER APPLICATION SECURITY

PRIORITY CLAIM

The present application is a National Phase entry of PCT Application No. PCT/EP2018/083358, filed Dec. 3, 2018, which claims priority from EP Patent Application No. 17205250.8, filed Dec. 4, 2017, each of which is hereby fully incorporated herein by reference.

TECHNICAL FIELD

The present disclosure relates to the security of software container.

BACKGROUND

Software services deployments are increasingly employing operating system functions providing process and namespace isolation. Such isolation allows the containment and execution of application environments in a common base operating system so providing for shared operating system and hardware resources such as kernel, libraries, processor, storage and the like. An example of this approach is the software tool known as "Docker" that employs the Linux operating system-level virtualization "LXC" (Linux Containers) to provide isolated software application containers executing in a base Linux operating system. Each container can include software applications, libraries and other resources and containers can be shared for installation on other computer systems. This approach provides many benefits over traditional machine virtualization which requires the instantiation of complete virtualized computing systems in each virtual machine so duplicating common resources.

Containers are increasingly used to package and distribute standardized applications for execution on potentially disparate configurations of a computer operating system. Containers can contain nested containers each of which can be adapted, replaced or removed and new containers may be added. For example, a web application may be formed in a container having a sub-container of particular operating system libraries required, a sub-container for a standardized image of a database installation (such as MySQL), a sub-container for a standardized image of a web server installation etc. Any reconfiguration of any of these sub-containers will result in a new container. Thus deployment of applications by container will result in variants of an original container shared between, and installed upon, one or more computer systems.

The variability of the container content introduces new security challenges. In particular, the inability to depend on a standardized size, content, checksum or arrangement of the application container precludes many integrity verification or malicious activity detecting mechanisms. The need to control undesirable behavior such as malicious performance by software is particularly acute where the software executes in a shared computing system with a common operating system kernel, common processor(s), common memory and other common resources. For example, denial of service could arise where one container performs such as to consume resource to the detriment or exclusion of other applications or containers executing in the computer system.

Furthermore, malicious attacks to network connected computer systems including containers present a serious and growing concern for the security of the systems, data stored and/or communicated by such systems and other computing entities operating in communication with such systems. For example, a server component such as a web server provided by a container can be compromised, such as by exploitation of a software or network vulnerability. Information, configuration and communications involving such compromised components are then at risk of potential disclosure to malicious entities. Additionally or alternatively, such a compromised system can be used to communicate with other malicious entities including other network connected components that are vulnerable to exploitation, such as client computer systems. Such attacks can include, for example, cross site scripting (XSS) and malware infection of a web server.

Preventing such malicious attacks requires first the detection of such attacks and it would be desirable to provide techniques for detecting malicious attacks in order that malicious entities can be constrained in their effort to spread malicious software throughout a network.

Container security can prevent the installation of security facilities such as intrusion detection, malware detection and the like, within a container after deployment. If such security facilities are not installed in a container, or if security facilities are ineffective or outdated, then container security can become compromised or non-optimal.

SUMMARY

Brief Description of the Drawings

Embodiments of the present disclosure will now be described, by way of example only, with reference to the accompanying drawings, in which.

DETAILED DESCRIPTION OF THE DRAWINGS

Figure 1:
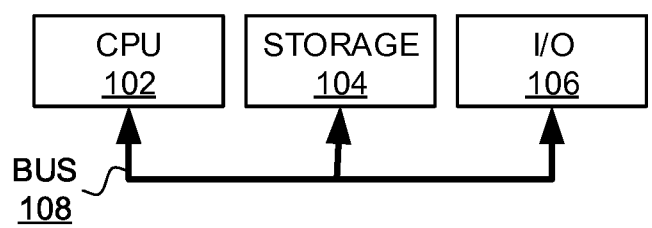
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Software applications executing in software containers in computer systems are protected from external interference by a container environment such as the Docker environment. Thus the installation of security detection and/or protection measures, fixes or remediations for security occurrences can be precluded without reverting to a container definition and redeploying an amended container. Embodiments of the present invention address this challenge by providing for the detection of anomalous behavior of a software container based on an extrinsic analysis of the container, such that remediations can be triggered. Such remediations can include, inter alia: interrupting operation of a container; identifying software components in communication with an application in a container as potentially compromised; identifying a definition of a container as anomalous—such as a definition on which basis the container is instantiated; and effecting a redeployment, reinstallation and/or reconfiguration of a container.

Figure 2:
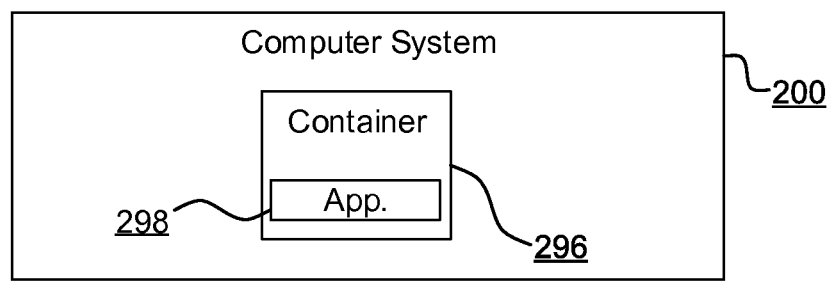
FIG. 2 is an illustration of an exemplary arrangement of a computer system configured to execute a container application according to embodiments of the present disclosure.

FIG. 2 is an illustration of an exemplary arrangement of a computer system 200 configured to execute a container application 298 according to embodiments of the present disclosure. The computer system 200 can be a physical, virtual or combination computer system and may be communicatively connected with one or more clients. Such clients and computer system 200 can be communicatively connected via one or more network connections such as wired or wireless network connections including connections via a intermediate network such as a wide area network or the internet.

The computer system 200 includes an operating system that provides isolation between software processes executing therein such as application containers 296. For example, the computer system can include a container manager executed at least in part by an operating system for receiving, installing and executing software containers. Such a container manager is Docker such as the Docker Engine that includes one or more daemon processes for interface by a Docker client through which the Docker Engine is instructed to retrieve and instantiate software containers. The Docker architecture is described in detail at docs.docker.com and in the document "Understanding the architecture" at "docs.docker.com/engine/understanding-docker". The operating system, in conjunction with a container manager, thus provide isolation between software processes such that two processes cannot access each other's resources. Such isolation could take a number of forms, such as namespace isolation, address space isolation or the like. All processes execute in the common operating system and on the common computer system 200 so avoiding duplication and redundancy as can be the case in fully virtualized environments employing, for example, a hypervisor.

Examples of resources that are isolated between processes executing in the operating system and are therefore not accessible between processes include, inter alia: processing resources; storage resource; and input/output resources. For example, resources to which access is prevented between isolated processes can include: threads of execution; tasks executing; memory and/or address space; data stores such as data storage devices; libraries, utilities, functions and procedures; network protocols; network connections and facilities; network ports; stack data structures; heap data structures; peripheral devices; and input/output devices such as displays, user interface devices, printers and the like.

In some embodiments the process isolation provided by the operating system includes namespace isolation where processes or groups of processes are separated such that resources of other processes or groups are not accessible. Such a facility can be combined with, for example, the Linux "cgroups" (control groups) facility for isolating the resource usage of one or more processes. Thus, in use, the computer system 200 executes processes such as application container 296 providing isolation therebetween.

Notably, while the operating system provides isolation between containers as hereinbefore described, containers may still be capable of intercommunication such as by way of network connections or the like between the processes in the same way as unrelated and isolated computer systems can communicated via a network if configured and permitted to do so. Such communication is not necessarily precluded by the operating system. Rather it is the execution environment—the process, task, memory, storage, input/output resources and the like for which isolation is effected.

The instantiation of a software container will now be briefly described. A container definition is received by a container manager for instantiation, installation and/or execution in the operating system of the computer system 200. The container definition is a software component for execution as an isolated process in the operating system. For example, the container definition can be a Docker container obtained from a container repository such as the Docker Hub. The container definition can be an image or template from which a container can be instantiated by or with the container manager for execution as one or more processes in the operating system. For example, the container definition can include a definition, identification or specification of one or more parts including nested containers, software applications, services, functions, libraries, drivers and the like. For example, a union file system can be employed to provide a single image of an application or process where multiple file system directories corresponding to different applications are represented in a combined form to provide a merged image of multiple parts of a container.

Once instantiated, the container 296 executes in the operating system of the computer system 200 and one or more applications 298 executed therein, enjoying the protections and isolations of the container environment.

In one embodiment, the application 298 is a web application such as a web application provided by a web server executing in the container 296. In such an embodiment, the container 296 includes a web server for providing one or more web applications such as application 298 as is well known in the art. In use, client computer systems such as web browsers can communicate with the application 298 via a network to access and utilize the web application 298. Such a web server included in the container 296 will include a configuration comprised of a plurality of features of the web server including, for example, inter alia: a web server type such as a particular web server software component characterized by its vendor, model, version or the like; web technology support characteristics such as which version of one or more web or other protocols are supported by the web server; a configuration of the web server in relation to one or more other components operating in, with or in communication with the computer system 200 such as middleware components, data storage components like databases, enterprise software components and other components as will be apparent to those skilled in the art; one or more configurations of how the web server undertakes traffic management including how web server messages, content and the like are divided or split between network communications; the nature of the web server header format for HTTP message headers; the parameters of the web server to be included in web server response messages; the particular web pages for the web application including templates, cascading style sheet (CSS) definitions, scripts, libraries and the like; serverside scripting such as PHP scripts and runtime; and other configuration and application characteristics for the web application.

Figure 3:
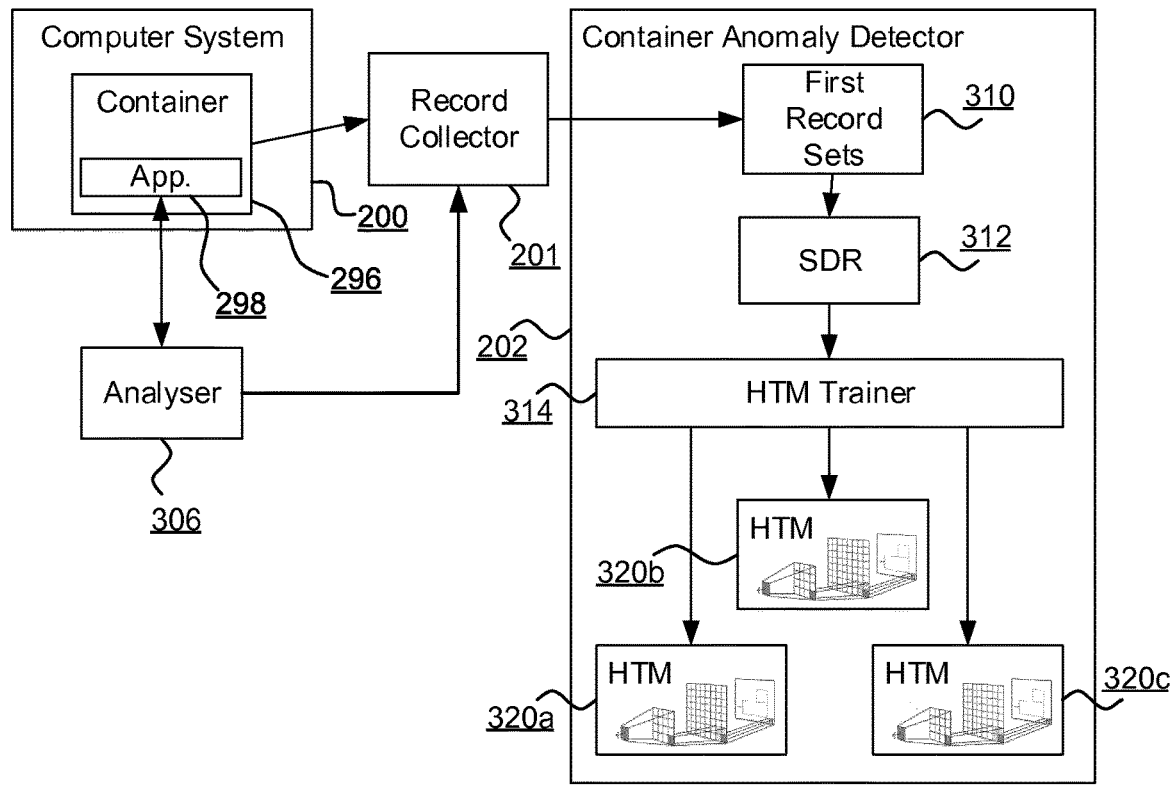
FIG. 3 is a component diagram illustrating the operation of a container anomaly detector component to train hierarchical temporal memories in accordance with embodiments of the present disclosure.

FIG. 3 is a component diagram illustrating the operation of a container anomaly detector component 202 to train hierarchical temporal memories 320 in accordance with embodiments of the present disclosure. An analyzer 306 is provided as a software, hardware, firmware or combination component suitable for communication with the computer system 200, such as, for example, a client of the application 298. For example, in one embodiment the analyzer 306 can include a web browser suitable for accessing static, dynamic and/or rich internet web pages constituting a client portion and/or interface to or for a web application executing in the container 296. Accordingly, the analyzer 306 operates as a client of such a web application in a training mode of operation in which the computer system 200, container 296, application 298 and analyzer 306 are absent any effect, tampering, infection or other encumbrance by malicious software, services or communications such as malware or attacks. For example, the analyzer 306 and computer system 200 can operate in a segregated, isolated, localized or otherwise protected environment such as a local network being disconnected from a wide area network or internet such that malicious encumbrances are avoided during the training mode of operation. The training mode of operation is a mode in which a model of typical characteristics of the application 298, the container 296, the computer system 200 and one or more network communications provided by the container 296 for the application 298 are modeled for subsequent use in anomaly detection. Thus, the analyzer 306 operates to access and/or use the application 298 by accessing static and/or dynamic features of the application 298 such as web pages in a normal usage absent malicious encumbrances. In one embodiment, such normal usage by the analyzer 306 is arranged to cover at least a minimum proportion of a range of features, facilities, web pages, services or other aspects of the application 298 in order that characteristics for the application 298 are broadly modeled.

Additionally, during the training mode of operation, a record collector 201 as a hardware, software, firmware or combination component is arranged to receive, access, obtain or determine records relating to the behavior of the container 296 having the application 298 executing therein. In particular, the record collector 201 receives: container network traffic records; application traffic records; and container resource records. The container network traffic records correspond to network traffic communicated with the container, such as: network traffic volume information; network protocol information; network packet information including packet size, frequency, type and the like; a number of packets received by the container; a number of packets transmitted by the container; a number of packets dropped; a number of network errors such as error packets; a volume of data communicated such as a number of bytes; and other network characteristics as will be apparent to those skilled in the art. Notably, the characteristics included in the network traffic records relate to all network traffic for the container 296.

The application traffic records correspond to network traffic communicated with the software application and are provided by the analyzer 306. In one embodiment in which the application 298 is a web application, the characteristics included in application traffic records can include at least part of a content of an HTTP header generated by a web server for communications as part of the execution of the application 298. Additionally or alternatively, the characteristics can include an indication, definition, identification or other characteristics relating to how the application 298 or a web server for the application 298 manages network traffic communicated to the analyzer 306 such as a profile of how network traffic is split, divided or distributed across network messages such as web server response messages sent to a browser at the analyzer 306. Additionally or alternatively, the characteristics can include features of one or more response messages generated by the application 298 or a web server for the application, such as HTTP response messages, in response to requests received from the analyzer 306. Such features of response messages can include particular parameters of response message fields as defined, for example, in HTTP response message format in section 6 of RFC2616 (Fielding, R. et al, The Internet Society, 1999, available at www.ietf.org/rfc/rfc2616.txt). Additionally or alternatively, the characteristics can include features of how the application 298 closes a connection such as, for example, by way of deferring to an underlying transport protocol such as a "FIN" message in TCP/IP, or by reliance on a web browser to close the connection. Yet further additionally or alternatively, the characteristics can include characteristics of a content of one or more web pages for the application 298 such as hypertext markup language (HTML) tags in one or more webpages.

For example, the record collector component 201 can be arranged to access, obtain, measure or otherwise determine a set of container network traffic records, a set of application traffic records and a set of container resource records as first records sets. In one embodiment, the record collector 201 is configured to receive messages such as HTTP messages from and/or via the analyzer 306 from which characteristics can be determined, derived, measured or inferred. In an alternative embodiment, the record collector 201 can additionally and/or alternatively receive information (such as HTTP messages) from the application 298 or container 296 directly, such as by way of a proxy for the analyzer 306 or the container 296. In a further alternative embodiment, the record collector 201 can be communicatively connected to the container 296 such as via a network. In one embodiment the record collector 201 can be provided with and/or on either the analyzer 306 or the computer system 200 such as a software component of the analyzer 306 or computer system 200. In one embodiment, the record collector 201 is a multi-part component being at least partly provided as a software component installed on one or more of: the computer system 200; the analyzer 306; and/or another computer system or component.

The container anomaly detector 202 is a hardware, firmware, software or combination component for identifying anomalies in the operation of the container 296 deployed in execution in the computer system 200. The anomaly detector 202 operates in two modes of operation: a training mode of operation in which it receives first sets of data from the record collector 201 with which to train a plurality of hierarchical temporal memories (HTMs); and an operational mode of operation in which is identifies anomalous behavior of the container 296. Similarly, therefore, the container 296 is operable in both a training mode of operation, in which there are no malicious influences thereon, and a production or operational mode of operation.

The container anomaly detector 202 receives first record sets 310 (i.e. each of a set of container network traffic records, a set of application traffic records and a set of container resource records) from the record collector 201 in respect of operation of the container 296 in the training mode of operation. The first record sets 310 are sets of records for characteristics of the container 296 in relation to operation of the application 298 for a defined period of time—known as a training time period.

The change detector 202 uses the records in each of the record sets 310 to constitute training data inputs for training hierarchical temporal machines (HTM) 320. An HTM 320 is trained for each record set in the first record sets 310 such that there is a trained HTM 320 for the set of container network traffic records (HTM 320a), a set of application traffic records (HTM 320b) and a set of container resource records (HTM 320c).

Each HTM 320 is a machine learning construct based on principles first described by Jeff Hawkins in "On Intelligence" (2004, Times Books, ISBN 0-8050-7456-2) and described in detail by Numenta in "Hierarchical Temporal Memory including HTM Cortical Learning Algorithms" (Numenta, 12 Sep. 2011). The principles of, implementation of and operation of the HTMs 320 are beyond the scope of this description and are nonetheless available to the skilled person through existing publications including the papers and books below, each and/or all of which are usable by a skilled person to implement the HTMs 320 and other associated features for embodiments of the present disclosure:

"Biological and Machine Intelligence (BAMI)—A living book that documents Hierarchical Temporal Memory (HTM)" (Numenta, Inc., Mar. 8, 2017) (retrieved Mar. 29, 2017) available from numenta.com/assets/pdf/biological-and-machine-intelligence/BAMI-Complete.pdf "Porting HTM Models to the Heidelberg Neuromorphic Computing Platform" (Billaudelle, S. & Ahmad, S., May 2015) available from Cornell University Library (citation arXiv:1505.02142) and arxiv.org/abs/1505.02142

"Encoding Data for HTM Systems" (Purdy, S., February 2016) available from Cornell University Library (citation arXiv:1602.05925) and arxiv.org/abs/1602.05925

"Properties of Sparse Distributed Representations and their Application To Hierarchical Temporal Memory" (Ahmad, S. & Hawkins, J., March 2015) available from Cornell University Library (citation arXiv:1503.07469) and arxiv.org/abs/1503.07469

"How Do Neurons Operate on Sparse Distributed Representations? A Mathematical Theory of Sparsity, Neurons and Active Dendrites" (Ahmad, S. & Hawkins, J., January 2016) available from Cornell University Library (citation arXiv:1601.00720) and arxiv.org/abs/1601.00720

"Real-Time Anomaly Detection for Streaming Analytics" (Ahmad, S. & Purdy, S., July 2016) available from Cornell University Library (citation arXiv:1607.02480) and arxiv.org/abs/1607.02480

"Evaluating Real-time Anomaly Detection Algorithms—the Numenta Anomaly Benchmark" (Lavin, A. & Ahmad, S., October 2015) available from Cornell University Library (citation arXiv:1510.03336) and arxiv.org/abs/1510.03336

"The HTM Spatial Pooler: A Neocortical Algorithm for Online Sparse Distributed Coding" (Cui, Y., Ahmad, S. & Hawkins, J., February 2017) available from Cold Spring Harbor Laboratory bioRxiv (citation doi.org/10.1101/085035) and biorxiv.org/content/biorxiv/early/2017/02/16/085035.full.pdf "Continuous Online Sequence Learning with an Unsupervised Neural Network Model" (Cui, Y., Ahmad, S. & Hawkins, K., November 2016) published in Published in Neural Computation (November 2016, Vol 28. No. 11) and available from numenta.com/papers/continuous-online-sequence-learning-with-an-unsupervised-neural-network-model/

"Why Neurons Have Thousands of Synapses, A Theory of Sequence Memory in Neocortex" (Hawkins, J. & Ahmad, S., March 2016) published in Frontiers in Neural Circuits (10 (2016) 1-13, doi:10.3389/fncir.2016.00023) and available from numenta.com/papers/why-neurons-have-thousands-of-synapses-theory-of-sequence-memory-in-neocortex/

At a very high level, in one embodiment, each HTM 320 is implementable logically as a hierarchy of functional nodes. The hierarchy of nodes in an HTM 320 are suitable for identifying coincidences in a temporal sequence of input patterns received at an input layer in the hierarchy, with interconnections between the layers permitting such identifications to take place also at each other level in the hierarchy. In addition to an identification of coincidences by nodes in an HTM 320, temporal relationships between coincidences can also be identified. Thus, in a purely exemplary arrangement, a first set of similar patterns occurring before a second set of similar patterns can be resolved to a coincidence (of the first set) with a temporal relationship to a coincidence (of the second set). The coincidences and temporal relations learned at each of many levels in an HTM 320 provide for subsequent recognition, by the HTM 320, of a conforming temporal sequence of input patterns and non-conformant sequences. Thus, the HTM 320 can be said to operate in: a learning mode of operation in which coincidences and relationships between coincidences are learned by adaptation of the HTM 320 (and as described with reference to FIG. 3); and an inference mode of operation in which the HTM 320 is executed (by which it is meant that the HTM 320 is applied) to process one or more inputs to determine a degree of recognition of the inputs by the HTM 320 based on what has been learned by the HTM 320 (and as described with reference to FIG. 4). Recognition can be based on a determination, by nodes in the HTM 320, of a set of probabilities that an input belongs to one or more known or recognized coincidences in the trained HTM 320, and probabilities that inputs represent a recognized temporal group of coincidences.

When applied in embodiments of the present disclosure, the HTMs 320 have two key features: firstly, each HTM 320 is trained based on one of the first record sets 310 to represent a model of the characteristics of container 296 during the training mode of operation; and secondly each HTM 320 can determine whether a subsequent record set is recognizable to the HTM 320 and thus bear similarity to the operation of the container 296 during training mode of operation. It is to be recalled that, during the training mode of operation, the container 296 is not encumbered by malicious activity and, thus, a failure to recognize subsequent record sets by a HTM 320 in an inference mode of operation is indicative of behavior of the container 296 that is anomalous.

While the HTMs 320 have been described, by way of overview, structurally here, it will be appreciated that its implementation can be a logical representation or approximation of such a structure including a mathematical implementation employing, for example, linear algebra and/or parallel processing means for implementation.

The HTMs 320 are trained by a HTM trainer 314 which is a hardware, software, firmware or combination component adapted to undertake the training of each HTM 320. It will be appreciated, on the basis of the above referenced papers and books, that the HTMs 320 preferably operate on the basis of sparse distributed representation (SDR) 312 of data. For example, an SDR can be a binary representation of data comprised of multiple bits in which only a small percentage of the bits are active (i.e. binary 1), and/or equivalent efficient representations of such schemes which may be compressed or the like (e.g. run-length encoded or the minority of bits that are active being somehow listed or otherwise identified). The bits in these representations have semantic meaning and meanings are distributed across the bits. SDR is described in "Sparse Distributed Representations" (Numenta, available from github.com/numenta/nupic/wiki/Sparse-Distributed-Representations and accessed on 29 Mar. 2017). Further, the principles underlying SDR are also described in "Sparse coding with an overcomplete basis set: A strategy employed by V1?" (Olshausen, B. A., Field, D. J., 1997, Vision Research, 37:3311-3325). Accordingly, the records in each of the first record sets 310 are initially encoded to a corresponding SDR representation 312 by a suitable encoder. Notably, the encoder is configured to set bits in a SDR 312 for a record based on a semantic meaning of the bits and thus the encoder is specifically configured to encode each record in to a SDR 312 based on semantic meaning of some aspect of the record including, for example, one or more of: a content of the record; characteristics of the record such as its length, origin, when it was received, how it was created, what created it etc.; what the record means, what it indicates, what consequence may ensue as a result of an occurrence recorded by the record etc.; and other aspects as will be apparent to those skilled in the art.

Thus, in use, the anomaly detector 202 trains an HTM 320 using SDR representation 312 of records received for each of the first record sets 310 for the container 296 in use during a training mode of operation. The training time period, during which the container 296 operates in the training mode of operation and the record collector 201 collects records of characteristics, can be determined based on a degree of recognition by the HTMs 320 of new training records in the first record sets 310. That is to say that the HTM Trainer 314 can additionally operate with the HTMs 320 to determine a degree of recognition of each record in the first record sets 310. In the early phases of training, a relatively greater proportion of records in the first record sets 310 will cause a low degree of recognition by the HTMs 320 since the HTMs 320 will be relatively untrained. As training continues, the model of the HTMs 320 will improve to reflect the characteristics of the container 296 and the degree of recognition will increase. The training period can be flexible to expire based on a degree of recognition of the HTMs 320 of records in the first record sets 310 such that when such a degree of recognition meets a predetermined threshold, then training can be configured to cease or reduce. In one embodiment, the HTMs 320 are adapted to provide an anomaly score for records in each of the first record sets 310 reflective of a degree of recognition and it is the anomaly scores meeting one or more predetermined thresholds that determines when training should cease or reduce.

Accordingly, following training, the HTMs 320 can be said to constitute models or records of characteristics of the container 296 during the training time period for which the first record sets 310 were received. These models are subsequently used to detect anomalous behavior of the container 296 as will be described with respect to FIG. 4.

Figure 4:
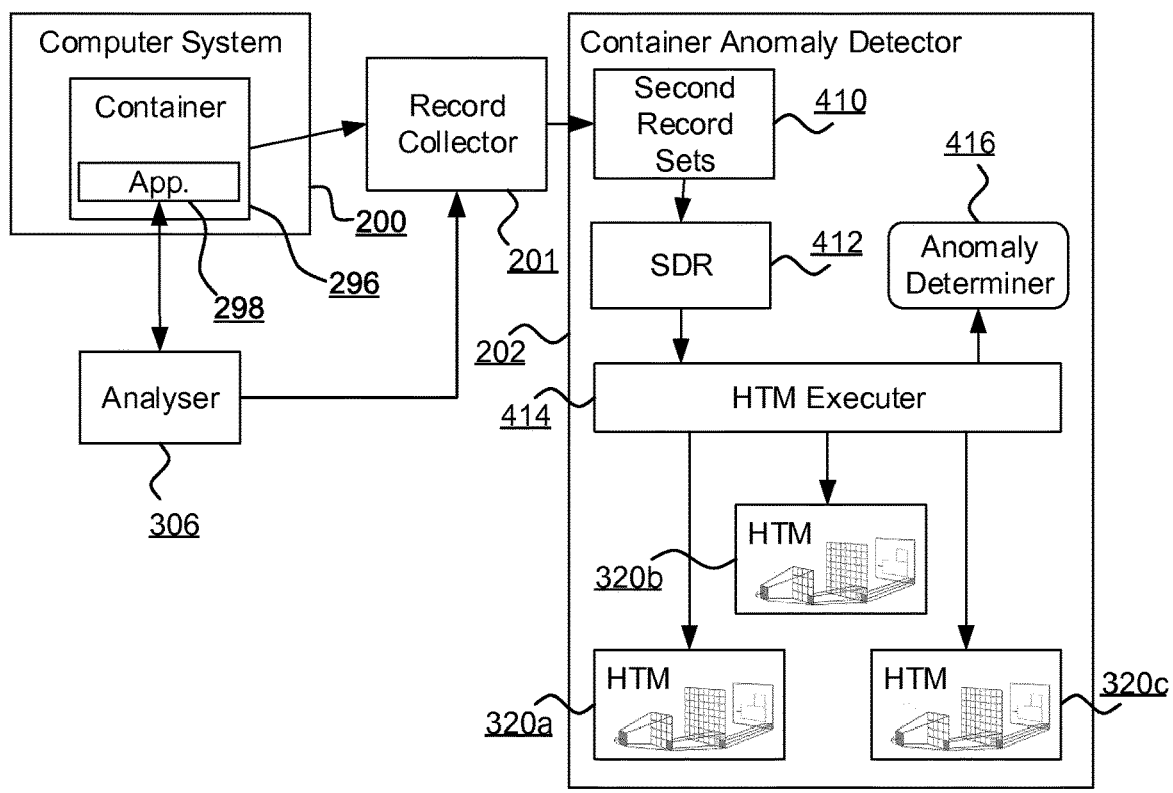
FIG. 4 is a component diagram illustrating the operation of the container anomaly detector component to detect anomalous behavior of the container in accordance with embodiments of the present disclosure.

FIG. 4 is a component diagram illustrating the operation of the container anomaly detector component 202 to detect anomalous behavior of the container 296 in accordance with embodiments of the present disclosure. The analyzer 306 in FIG. 4 is operable to communicate with the application 298 in a normal or production mode of operation in which there is no assurance, implication or presumption that the computer system 200, the container 296, the application 298 and/or the analyzer 206 are operating without the influence, encumbrance or effect of malicious software and/or communication. The period during which the client operates in the normal or production mode of operation can be referred to as an operational time period and is defined as distinct to the training time period. During the operational time period, the record collector 201 generates second sets of records 410 as a set of container network traffic records, a set of application traffic records and a set of container resource records as second records sets. These records are collected substantially as hereinbefore described with reference to FIG. 3.

Thus, the anomaly detector 202 receives second record sets 410 from the record collector 201 relating to the operational time period. Subsequently, an SDR 412 of the records of each of the second record sets 410 is generated by an encoder substantially as previously described with respect to the first record sets 310. An HTM executer 414 then executes each of the HTMs 320 (now trained by way of the arrangement of FIG. 3) in an inference or recognition mode of operation. In this mode of operation, the HTMs 320 determine a degree of recognition of each SDR data item input to it based on its learned model of the container 296 during the training time period. Based on this degree of recognition each HTM 320 also identifies anomalies as SDR inputs that are not recognized by the trained HTM 320.

Notably, the HTM Trainer 214 of FIG. 3 trains one HRM 320 for each of the sets in the first record sets 310 such that there is one HTM 320a trained by a set of container network traffic records; one HTM 320b trained by a set of application traffic records; and one HTM 320c trained by a set of container resource records. Subsequently, the HTM executer 414 of FIG. 4 determines recognition by the HTMs 320 along similar lines such that the second sets 410 are applied to respective HTMs 320 thus: a second set of container network traffic records is processed by an HTM 320a trained by a first set of container network traffic records; a second set of application traffic records is processed by an HTM 320b trained by a first set of application traffic records; and a second set of container resource records is processed by an HTM 320c trained by a first set of container resource records.

The HTMs 320, modeling the container 296 during the training time period, will indicate a strong degree of recognition of SDR for records of the second record sets 410 arising from operation of the container 296 exhibiting characteristics consistent with those during the training period. If, however, anomalies are detected by the HTMs 320 such that records from the second record sets 410 are not recognized by the HTMs 320, such anomalies indicate container 296 characteristics deviating from those exhibited during the training time period. An anomaly can be identified by an HTM 320 based on a threshold degree of similarity of SDR 412 for records in a second record set 410. Thus, where anomalies are identified by a HTM 320 then a deviation from an expected behavior (based on the training) is observed.

An anomaly determiner 416 is a software, hardware, firmware or combination component responsive to the HTM executer 414 to determine that anomalous behavior of the container 296 has been detected. Anomalous behavior is identified when a degree of recognition (or an anomaly score) generated with reference to an HTM 320 exceeds a predetermined threshold. Furthermore, the anomaly determiner 416 is arranged to identify a coincidence of a degree of recognition of each of the HTMs 320a, 320b and 320c being below a threshold degree to identify an anomaly. Such a coincidence of a degree of recognition can include a temporal coincidence such that anomalous behavior is exhibited in each of the second set of container network traffic records, the second set of application traffic records and the second set of container resource records at a temporally similar point. Temporal similarity means at a similar time such that a time of occurrence of one or more anomalous records in a second set 410 occurs within some distance of time of one or more anomalous records in each of the other second sets 410. Such a temporal similarity can be defined by a predetermined time window having a predetermined time duration within which data records in the second records sets 410 causing failures of recognition by respective HTMs 320 is determined to constitute a behavioral anomaly by the anomaly determiner 416.

Notably, identification of an anomaly in any one of the second data sets is not, in itself, necessarily indicative of problematic anomalous behavior of the container 296 since deviations of behavior within network traffic, application network traffic and resource usage can be expected to occur for acceptable reasons. However, coincidences of such anomalous behavior across all three such data sets is a clear indicator of anomalous behavior affecting all of the communication with a container, communication by or with an application executing therein and resource usage of the container. Accordingly, false positive indications of anomaly are considerably reduced.

Figure 5:
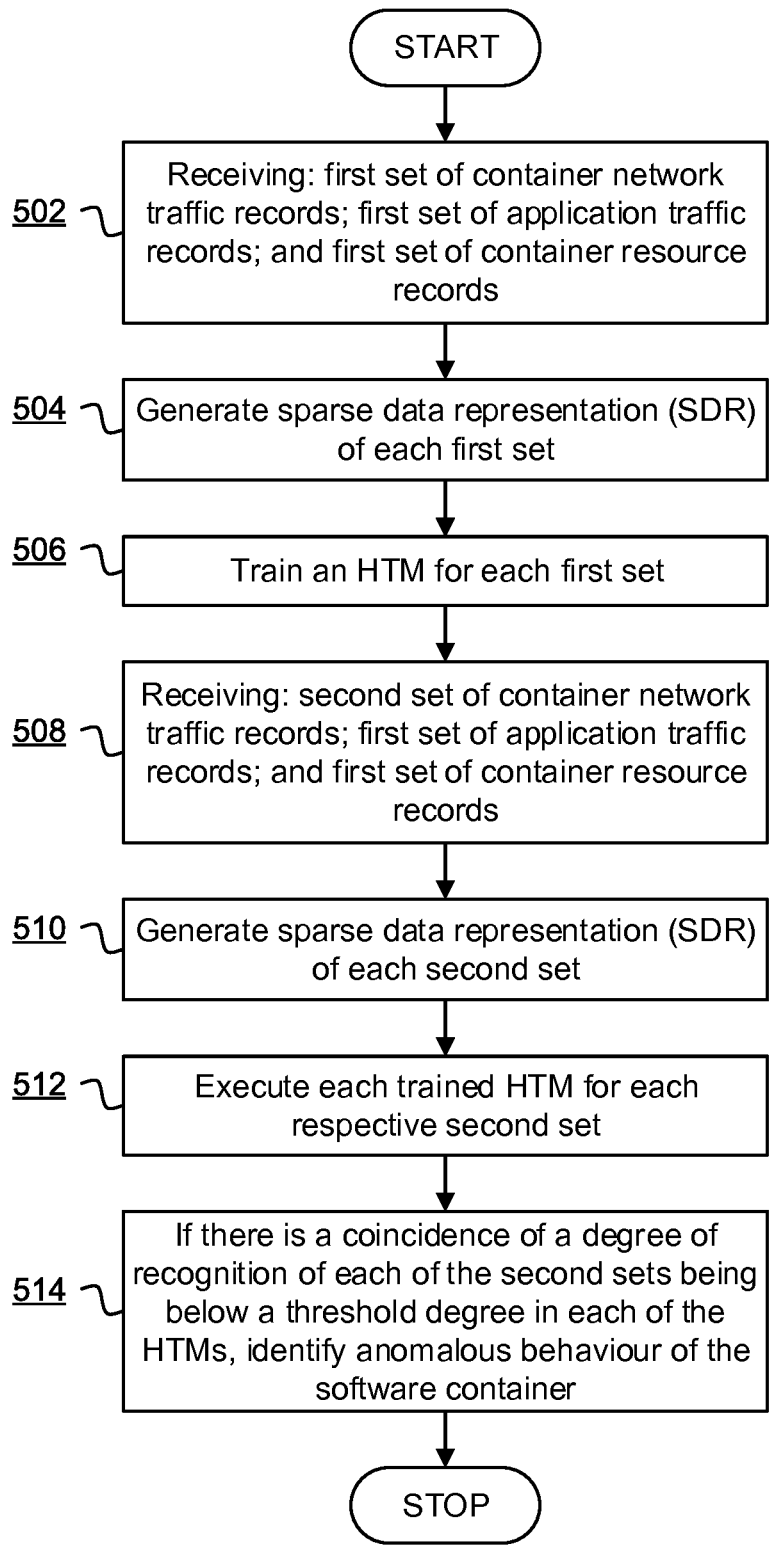
FIG. 5 is a flowchart of a method to detect anomalous behavior of a software container in accordance with embodiments of the present disclosure.

FIG. 5 is a flowchart of a method to detect anomalous behavior of a software container 296 in accordance with embodiments of the present disclosure. At 502, in a training mode of operation, the record collector 201 receives each of: a first set of container network traffic records; a first set of application traffic records; and a first set of container resource records (the first sets). At 504 each first set of data records is converted to a semantic data representation. At 506 an HTM 320 is trained for each of the first sets. At 508, in an operational mode of operation, the record collector 201 receives each of: a second set of container network traffic records; a second set of application traffic records; and a second set of container resource records (the second sets). At 510 each second set of data records is converted to a semantic data representation. At 512 each HTM 320 is executed to determine a degree of recognition of the SDR of the second sets. At 514 a coincidence of a degree of recognition of each of the second sets being below a threshold degree is each of the HTMs 320 is used to identify anomalous behavior of the container 296.

Exemplary embodiments of the disclosure will now be considered specifically with reference to obtaining and representing container network traffic records; application traffic records; and container resource records.

Application traffic records will be considered for an embodiment in which the application 298 is a web application operating with a web server executing in the container 296. An evaluation of the behavior of a number of different web servers identifies that each web server can exhibit different characteristics based on its implementation, vendor, version, update, or configuration. For example, these differing characteristics can include:

HTTP Header Content: each web server can generate HTTP response messages with different header content.
Traffic Management: web servers may employ a different traffic management mechanism to manage how responses are communicated to web browsers. For example, such characteristics can determine how network communications are generated, a size of units of communication such as packets, the content of each unit of communication, etc.
HTTP Response Messages: different web servers may generate differently structure, formatted or substantively different response messages to web browser requests such as POST requests.
Closing the Web Connections: web servers can determine how a web connection should be closed, for example, whether by using an underlying protocol such as sending "FIN" in TCP/IP or relying on a web browser to close a connection.

How HTM 320s can be used to model a web application based on configuration characteristics of a web server employed for the application 298 will now be considered with reference to HTTP response messages by way of example only. The table below shows how different web servers can have different response messages.

| Server | Exemplary HTTP Response Message |
|---|---|
| Apache 2.2.4 with PHP enabled | HTTP/1.1 200 OK<br>Date: Thu., 04 Feb 2016 09:11:47 GMT<br>Server: Apache/2.2.4 :Win32 DAV/2 mod__ssl/2.2.4 OpenSSL/0.9.8d mod__autoindex__color PHP/5.2.1<br>Last-Modified: Sat, 11 Nov 2006 14:13:22 GMT<br>ETag: "7b2fa-1052-456a2480"<br>Accept-Ranges: bytes<br>Content-Length: 4178<br>Keep-Alive: timeout=5, max=99<br>Connection: Keep-Alive<br>Content-Type: text/css |
| Apache 2.4.18 with PHP enabled | HTTP/1.1 304 Not Modified<br>Date: Thu, 11 Feb 2016 10:46:42 GMT<br>Server: Apache/2.4.18 (Win32) OpenSSL/1.0.2e PHP/7.0.2<br>Last-Modified: Tue, 06 Oct 2015 10:03:37 GMT<br>ETag: "5675-52353982e9280"<br>Accept-Ranges: bytes<br>Content-Length: 3145<br>Connection: Keep-Alive<br>Keep-Alive: timeout=5, max=97<br>Content-Type: text/html |
| Tomcat 7.0 | HTTP/1.1 200 OK<br>Server: Apache-Coyote/1.1<br>Accept-Ranges: bytes<br>ETag: W/"9756-1305217116000"<br>Last-Modified: Thu, 12 May 2011 16:18:36 GMT<br>Content-Type: text/css<br>Content-Length: 9756<br>Date: Thu, 04 Feb 2016 09:10:03 GMT |

Web application communication traffic from a web server contains characteristics for a web application. Each response message contains a list of attributes and their values. Characteristics include: the order of attributes; the number of attributes; and values of attributes. For example, in the above table, two HTTP response headers from two different web servers are given as examples. An HTM model of web application configuration characteristics can be learned for a web application and the model can be used to detect behavioral anomalies in such characteristics indicative of, for example, a configuration change for the web application.

In order to best employ the capability of an HTM 320 to model application traffic records it is preferable to adapt characteristic information in an SDR format:

1. Different web applications with potentially different configuration characteristics will have different HTTP response messages. First, response message fields are converted into an attribute sequence with field values as elements of the sequence. For example, the HTTP response from two different web applications executing with different web servers can be turned into the following sequences of characteristics:

Apache 2.2.4 Server: Date:value→Server:value→Last-Modified:value→ETag:value→Accept-Ranges:value→Content-Length:value→Keep-Alive:value→Connection:value→Content-Type:value Apache 2.4.18 Server: Date:value→Server:value→Last-Modified:value→ETag:value→Accept-Ranges:value→Content-Length:value→Connection:value→Keep-Alive:value→Content-Type:value Tomcat 7.0 Server: Server:value→Accept-Ranges:value→ETag:value→Last-Modified:value→Content-Type:value→Content-Length:value→Date:value From these examples we can see that, while the names of attributes are standardized, their order is quite different and depends on a type or configuration of a web server used by a web application.

2. These sequences of characteristics form a basis for training the HTM. In one embodiment, the sequences can be regularized using generalization rules. For example, instead of ETag: "7b2fa-1052-456a2480", a regularized expression can be formulated such as ETag: "^([a-z0-9]{5}-[a-z0-9]{4}-[a-z0-9]{8})$". Similarly, instead of Date: Thu, 4 Feb. 2016 09:10:03 GMT, a regularized expression can be formulated such as Date: "EEE, dd MMM yyyy HH:mm:ss z".

Using such an approach the sequences above can be converted to:

Apache 2.2.4 Server: Date: "EEE, dd MMM yyyy HH:mm:ss z"→Server: "Apache/2.2.4: Win32 DAV/2 mod_ssl/2.2.4 OpenSSL/0.9.8d mod_autoindex_color PHP/5.2.1"→Last-Modified: "Sat, 11 Nov. 2006 14:13:22 GMT"→ETag: "^([a-z0-9]+-[a-z0-9]+-[a-z0-9]+)$"→Accept-Ranges: "bytes"→Content-Length: "\\d+"→Keep-Alive: "timeout=(\\d+), max=(\\d+)"→Connection: "Keep-Alive"→Content-Type: "^([a-z]/[a-z])$"

Apache 2.4.18 Server: Date: "EEE, dd MMM yyyy HH:mm:ss z"→Server: "Apache/2.4.18 (Win32) OpenSSL/1.0.2e PHP/7.0.2"→Last-Modified: "Tue, 6 Oct. 2015 10:03:37 GMT"→ETag: "^([a-z0-9]+-[a-z0-9]+)$"→Accept-Ranges: "bytes"→Content-Length: "\\d+"→Keep-Alive: "timeout=(\\d+), max=(\\d+)"→Connection: "Keep-Alive"→Content-Type: "^([a-z]/[a-z])$"

Tomcat 7.0 Server: Server: "Apache-Coyote/1.1"→Accept-Ranges: "bytes"→ETag: "^(W/\"[0-9]+-[0-9]+\")$"→Last-Modified: "Thu, 12 May 2011 16:18:36 GMT"→Content-Type: "^([a-z]/[a-z])$"→Content-Length: "\\d+"→Date: "EEE, dd MMM yyyy HH:mm:ss z"

3. For training an HTM, each element of a signature sequence needs to be encoded into SDR. An existing SDR category encoder from an HTM implementation can be used here. For example, a 100 bits SDR can be used with 10% of bits activated to encode each element of a sequence, with bits having semantic significance in the context of the characteristics in a signature sequence. The three examples in the previous step can be encoded as shown in the following tables:

| 4. Apache 2.2.4 Server | |
| --- | --- |
| Element of sequence | Encoded SDR |
| Date: "EEE, dd MMM yyyy HH:mm:ss z" | 0 0 0 0 0 0 0 0 0 0 0 0 0 0 0 0 0 1 0 0 0 0 0 0 0 0 0 0 0 0 0 0 0 1 0 0 0 0 0 0 0 0 0 0 0 0 0 0 0 0 0 0 0 0 0 0 0 0 1 1 0 0 0 0 0 0 1 0 0 0 1 0 0 1 0 0 0 0 0 0 0 0 0 0 0 1 0 0 1 0 0 0 1 0 0 0 |
| Server: "Apache/2.2.4 :Win32 DAV/2 mod_ssl/2.2.4 OpenSSL/0.9.8d mod_autoindex_color PHP/5.2.1" | 0 0 1 0 0 1 0 0 0 0 1 0 0 0 0 0 0 0 0 0 0 0 0 0 0 0 0 0 0 1 0 0 0 0 1 0 0 0 0 0 0 0 0 0 0 0 0 1 0 0 0 0 0 1 0 0 0 0 0 0 0 0 0 0 1 0 0 0 0 0 0 0 0 0 0 0 0 0 0 0 0 0 0 0 0 0 1 1 |
| Last-Modified: "Sat, 11 Nov 2006 14:13:22 GMT" | 1 0 0 0 0 1 0 0 0 0 0 0 0 0 1 0 0 0 0 1 0 0 0 0 0 0 0 0 0 0 0 1 0 0 0 0 0 0 0 0 0 0 0 0 0 0 1 1 0 0 0 0 0 0 0 1 0 0 0 0 0 0 0 0 0 0 0 1 0 0 0 0 0 0 0 0 0 0 0 1 0 0 0 0 0 0 0 0 |
| ETag: "^([a-z0-9]{5}-[a-z0-9]{4}-[a-z0-9]{8})$" | 1 0 0 0 0 0 0 0 0 0 0 0 0 0 0 0 0 0 1 0 0 0 0 0 0 0 0 0 0 0 1 0 0 0 1 0 0 0 0 0 0 0 0 0 0 0 0 1 0 0 0 0 1 0 0 1 0 0 0 0 0 0 0 0 0 0 0 0 0 1 0 0 0 0 0 0 0 0 0 1 0 0 0 1 0 0 0 0 0 0 0 0 |
| Accept-Ranges: "bytes" | 1 0 0 0 1 0 0 0 0 0 0 0 0 0 0 0 0 0 0 0 0 0 0 0 0 0 1 0 0 0 0 0 1 0 0 0 0 0 0 1 0 0 0 0 0 1 0 0 0 1 0 0 1 0 0 0 0 0 0 0 0 0 0 0 0 0 0 1 0 0 0 0 0 0 1 0 0 0 0 0 0 0 0 0 0 0 0 0 |
| Content-Length: "\\d+" | 0 0 0 0 0 0 0 0 1 0 0 0 0 1 0 1 0 0 0 0 0 0 0 0 0 0 1 0 0 0 0 0 0 0 0 0 0 0 0 0 0 0 0 0 0 0 0 0 0 0 0 0 1 0 0 0 0 0 1 0 0 0 0 0 0 0 0 0 0 0 1 0 0 1 0 0 0 0 0 0 0 1 0 1 0 |
| Keep-Alive: "timeout=(\\d+), max=(\\d+)" | 0 1 0 0 0 0 0 0 0 0 0 0 0 0 0 1 0 0 0 0 0 0 1 0 0 0 0 0 0 0 0 0 1 0 0 0 0 0 0 0 0 0 0 0 0 0 0 0 0 0 0 0 0 1 0 0 0 1 0 0 0 0 0 0 0 0 0 0 0 0 0 0 0 0 0 0 0 0 1 1 0 0 0 1 0 0 0 0 0 1 0 0 |

4. Apache 2.2.4 Server

| Element of sequence | Encoded SDR |
|---|---|
| Connection: "Keep-Alive" | 0 0 0 0 0 0 0 0 1 0 1 0 0 0 0 0 0 1 0 0 0 0 0<br>0 0 0 1 0 0 0 0 0 0 0 0 0 0 0 0 0 0 1 0 0 0 0<br>0 0 0 0 0 0 0 0 0 0 0 0 0 1 0 0 0 0 0 0 0 0 0<br>1 0 0 0 0 0 0 0 0 0 1 0 0 0 0 0 1 0 0 0 0 0 0<br>0 0 0 1 0 0 0 0 |
| Content-Type: "^([a-z]/[a-z])$" | 0 1 0 0 0 0 0 0 0 0 0 0 0 0 0 0 0 0 0 0 0 1 0 0<br>0 0 1 0 0 0 0 0 0 1 0 0 0 1 0 0 0 0 0 0 0 0 0<br>0 0 0 0 1 0 0 1 0 0 0 0 0 0 0 0 0 0 0 0 0 0 0<br>0 0 0 0 0 1 1 0 0 0 0 0 0 0 0 0 0 0 0 0 0 0 0<br>0 0 1 0 0 0 0 0 |

Apache 2.4.18 Server

| Element of sequence | Encoded SDR |
|---|---|
| Date: "EEE, dd MMM yyyy HH:mm:ss z" | 0 0 0 0 0 0 0 0 0 0 0 0 0 0 0 0 0 1 0 0 0 0 0<br>0 0 0 0 0 0 0 0 0 0 0 1 0 0 0 0 0 0 0 0 0 0 0<br>0 0 0 0 0 0 0 0 0 0 0 0 0 0 0 0 0 1 1 0 0 0 0 0<br>1 0 0 0 1 0 0 1 0 0 0 0 0 0 0 0 0 0 0 0 1 0 0<br>1 0 0 0 1 0 0 0 |
| Server: "Apache/2.4.18 (Win32) OpenSSL/1.0.2e PHP/7.0.2" | 0 0 0 1 0 0 0 0 1 0 0 0 0 0 0 0 0 0 0 0 0 0 0<br>0 1 0 0 0 0 0 0 0 0 1 0 0 0 0 0 0 0 0 0 1 0 0<br>0 1 0 0 0 1 0 0 0 0 0 0 0 0 0 0 0 0 0 0 0 1 0<br>0 0 0 0 0 0 0 0 0 0 0 1 0 0 0 0 0 0 0 0 0 0 0<br>0 0 1 0 0 0 0 0 |
| Last-Modified: "Tue, 06 Oct 2015 10:03:37 GMT" | 0 0 0 0 0 0 0 1 0 0 0 0 0 0 0 0 0 0 0 0 0 0 0<br>0 0 0 0 0 0 0 0 0 0 0 0 0 0 0 0 0 0 0 0 0 0 0<br>1 0 0 1 0 0 0 0 0 0 1 1 0 0 0 0 0 0 1 0 0 0 0<br>0 0 0 0 0 0 1 0 0 0 0 0 0 0 0 1 0 0 0 0 1 0 0 1<br>0 0 0 0 0 0 0 0 |
| ETag: "^([a-z0-9]+−[a-z0-9]+)$" | 0 0 0 1 0 0 0 0 1 0 0 0 0 0 0 0 0 0 0 0 0 0 0<br>0 0 0 0 0 0 0 0 0 0 0 0 0 0 0 0 0 0 0 0 0 0 1<br>0 0 0 0 1 0 0 0 0 0 0 1 0 0 0 0 0 0 0 0 1 0 0<br>1 0 0 0 0 0 0 1 1 0 0 0 0 0 0 0 0 0 0 0 0 1 0<br>0 0 0 0 0 0 0 0 |
| Accept-Ranges: "bytes" | 1 0 0 0 1 0 0 0 0 0 0 0 0 0 0 0 0 0 0 0 0 0 0<br>0 0 0 0 0 0 1 0 0 0 0 0 0 1 0 0 0 0 0 0 0 0 1<br>0 0 0 0 1 0 0 0 1 0 0 1 0 0 0 0 0 0 0 0 0 0 0<br>0 0 0 0 0 0 0 1 0 0 0 0 0 0 0 1 0 0 0 0 0 0 0<br>0 0 0 0 0 0 0 0 |
| Content-Length: "\\d+" | 0 0 0 0 0 0 0 0 1 0 0 0 0 0 1 0 1 0 0 0 0 0 0<br>0 0 0 0 0 1 0 0 0 0 0 0 0 0 0 0 0 0 0 0 0 0 0<br>0 0 0 0 0 0 0 0 0 0 0 0 1 0 0 0 0 0 1 0 0 0 0<br>0 0 0 0 0 0 0 0 0 0 0 0 0 0 0 1 0 0 1 0 0 0 0 0<br>0 0 0 0 1 0 1 0 |
| Connection: "Keep-Alive" | 0 0 0 0 0 0 0 0 1 0 1 0 0 0 0 0 0 1 0 0 0 0 0<br>0 0 0 1 0 0 0 0 0 0 0 0 0 0 0 0 0 0 1 0 0 0 0<br>0 0 0 0 0 0 0 0 0 0 0 0 0 1 0 0 0 0 0 0 0 0 0<br>1 0 0 0 0 0 0 0 0 0 1 0 0 0 0 0 1 0 0 0 0 0 0<br>0 0 0 1 0 0 0 0 |
| Keep-Alive: "timeout=(\\d+), max=(\\d+)" | 0 1 0 0 0 0 0 0 0 0 0 0 0 0 0 1 0 0 0 0 0 0 1<br>0 0 0 0 0 0 0 0 1 0 0 0 0 0 0 0 0 0 0 0 0 0 0<br>0 0 0 0 0 0 0 0 0 0 0 1 0 0 0 1 0 0 0 0 0 0 0<br>0 0 0 0 0 0 0 0 0 0 0 0 0 0 0 0 0 0 0 0 1 1 0 0 0<br>1 0 0 0 0 1 0 0 |
| Content-Type: "^([ a-z]/[a-z])$" | 0 1 0 0 0 0 0 0 0 0 0 0 0 0 0 0 0 0 0 0 0 1 0 0<br>0 0 1 0 0 0 0 0 0 1 0 0 0 1 0 0 0 0 0 0 0 0 0<br>0 0 0 0 1 0 0 1 0 0 0 0 0 0 0 0 0 0 0 0 0 0 0<br>0 0 0 0 0 1 1 0 0 0 0 0 0 0 0 0 0 0 0 0 0 0 0<br>0 0 1 0 0 0 0 0 |

| Tomcat 7.0 Server | |
|---|---|
| Element of sequence | Encoded SDR |
| Server: "Apache-Coyote/1.1" | 0 0 0 0 0 1 0 0 0 0 0 0 0 0 0 1 0 0 1 0 1 |
| | 0 0 0 0 0 0 1 0 0 0 0 0 1 0 0 0 0 0 0 0 0 |
| | 0 0 0 0 0 0 1 0 0 0 0 0 0 0 0 0 0 0 0 0 0 |
| | 0 0 0 0 0 1 0 0 0 0 0 0 0 0 0 0 0 0 0 0 0 |
| | 0 0 0 0 0 0 0 0 1 0 0 1 |
| Accept-Ranges: "bytes" | 1 0 0 0 1 0 0 0 0 0 0 0 0 0 0 0 0 0 0 0 0 |
| | 0 0 0 0 0 0 0 1 0 0 0 0 0 0 1 0 0 0 0 0 0 |
| | 0 1 0 0 0 0 0 1 0 0 0 1 0 0 1 0 0 0 0 0 0 |
| | 0 0 0 0 0 0 0 0 0 0 0 1 0 0 0 0 0 0 0 1 0 0 0 |
| | 0 0 0 0 0 0 0 0 0 0 0 0 |
| ETag: "^(W/\"[0-9]+-[0-9]+\")$" | 0 0 0 0 0 0 0 0 0 0 1 0 0 0 0 1 0 0 0 0 0 |
| | 0 0 0 0 0 0 1 0 0 0 0 0 0 0 1 0 0 0 0 0 0 0 |
| | 0 0 0 0 0 0 0 0 0 0 0 0 1 0 0 0 0 0 1 0 1 0 |
| | 0 0 0 0 0 0 0 0 0 0 0 0 0 0 0 0 0 0 0 0 0 |
| | 1 0 0 1 0 0 0 0 1 0 0 0 0 |
| Last-Modified: "Thu, 12 May 2811 16:18:36 GMT" | 0 1 0 0 0 0 0 0 0 0 0 0 0 0 0 0 0 0 0 0 0 |
| | 0 1 0 0 0 0 0 0 0 0 0 0 0 0 0 0 0 0 0 1 0 |
| | 0 0 0 0 0 0 0 0 0 0 0 0 0 0 0 0 0 0 1 0 0 |
| | 0 0 0 0 0 0 0 0 0 0 0 0 0 1 0 0 0 0 0 0 0 |
| | 0 0 1 0 1 0 1 1 0 1 0 0 |
| Content-Type: "^([a-z]/[a-z])$" | 0 1 0 0 0 0 0 0 0 0 0 0 0 0 0 0 0 0 0 1 0 |
| | 0 0 0 1 0 0 0 0 0 0 1 0 0 0 1 0 0 0 0 0 0 0 |
| | 0 0 0 0 0 0 1 0 0 1 0 0 0 0 0 0 0 0 0 0 0 |
| | 0 0 0 0 0 0 0 0 1 1 0 0 0 0 0 0 0 0 0 0 0 |
| | 0 0 0 0 0 0 1 0 0 0 0 0 |
| Content-Length: "\\d+" | 0 0 0 0 0 0 0 0 1 0 0 0 0 0 1 0 1 0 0 0 0 0 |
| | 0 0 0 0 0 0 1 0 0 0 0 0 0 0 0 0 0 0 0 0 0 |
| | 0 0 0 0 0 0 0 0 0 0 0 0 0 0 0 1 0 0 0 0 0 1 |
| | 0 0 0 0 0 0 0 0 0 0 0 0 0 0 0 0 0 1 0 0 1 0 |
| | 0 0 0 0 0 0 0 1 0 1 0 |
| Date: "EEE, dd MMM yyyy HH:mm:ss z" | 0 0 0 0 0 0 0 0 0 0 0 0 0 0 0 0 0 1 0 0 0 0 |
| | 0 0 0 0 0 0 0 0 0 0 0 1 0 0 0 0 0 0 0 0 0 |
| | 0 0 0 0 0 0 0 0 0 0 0 0 0 0 0 0 0 1 1 0 0 |
| | 0 0 0 1 0 0 0 1 0 0 1 0 0 0 0 0 0 0 0 0 0 |
| | 0 1 0 0 1 0 0 0 1 0 0 0 |

The SDR representation can be used to train an HTM to develop a model of web application configuration characteristics. It is necessary to continuously train the HTM with SDR encoded records of configuration characteristics in a correct order so that the HTM can develop the appropriate model which has a temporal dimension. Every time an element of a sequence is input to the HTM during training, the HTM can provide an anomaly score (e.g. normalized between 0 and 1) for the input. At the beginning of the training, as the HTM has not learned characteristics yet, inputs will generate anomaly scores indicating a lack of recognition by the HTM. However, as the HTM learns sufficient the features of the input sequences (e.g. 1000-3000 training examples), the anomaly score can stabilize to a relatively lower level.

Monitoring configuration characteristics for a web application is effective for identifying changes to a web application configuration such as changes to an underlying web browser or its configuration. Furthermore, additionally or alternatively training the HTM based on web page characteristics can serve to identify web page changes arising from malicious encumbrances such as malicious software or network communication.

For example, malware can infect a web server in order to communicate commands to other infected network connected systems. Such commands can be embedded in HTML web pages such as inside additional HTML tags for receipt and reading by a receiving infected system. Additionally or alternatively, malware infecting a web server can cause the distribution of malicious code to other network connected systems to infect them or to update an incumbent infection. For example, such code can be included in additional HTML tags and/or embedded scripts such as JavaScript. Furthermore, an attacker can attack a web server using cross site scripting—XSS—such as a reflective XSS whereby the attacker injects malicious script that can be reflected to each client requesting an HTML web page in order to infect the client or redirect the client as part of a phishing activity intended to access sensitive information of the client or its user.

Thus, once malware infects a web server, then the malware may use the web server as a vehicle to spread infection via responses to client web requests, such as by sending the malware or a link to the malware, or malware infection code, to a client web browser. Additionally or alternatively, malware may send commands to infected systems such as bots in a botnet listening on an infected system.

Where malware communicates binary code in a requested web page, the web page may include additional <script>, <onload> or similar HTML tags that provide for the execution of scripts followed by a binary representation of malware code, such as code to infect a receiving system once executed. Some malware can be distributed stealthily by splitting the actual code into smaller parts and spreading these parts across multiple sections of a HTML document or, indeed, multiple documents. This is an effort to evade detection since malicious code in a single place within an HTML file may trigger conventional intrusion detection or virus detection rules. However, where the code is split within an HTML file then such rules may be evaded and the code may pass without detection. Thus the use of additional tags is commonplace in the distribution of such code.

Similarly, an attacker may seek to compromise a web server to access sensitive information or to inject malicious JavaScript that will run on client web browsers to reveal confidential information from the customer, steal access cookies to web servers, or redirect the user to phishing web site to steal credentials (for example, redirect a user to a fake bank login web site to steal his credentials). An example the XSS attack or defacing attack where an attacker will inject malicious JavaScript into one or more web pages of a vulnerable web application in order to redirect a user to another malicious web server or run the JavaScript into the user's browser to steal their confidential cookies to access other web servers. Such an approach also involves the use of additional tags in HTML web pages.

A learned HTM model based on characteristics of a web application corresponding to characteristics of a content of one or more web pages can be used to detect such malicious changes to web pages for the web application.

Below is an exemplary HTML web page, hello.html, for an exemplary web application running on a web server:

```
<HTML>
<BODY>
<P><B>Hello World!</B></P>
</BODY>
</HTML>
```

A possible result of an attack directed at the web server hosting hello.html is the injection of a piece of JavaScript code to display an extra link to a phishing page as illustrated in the revised version of hello.html below:

```
<HTML>
<BODY>
<P><B>Hello World!</B></P>
</BODY>
</HTML>
<SCRIPT>
var a = document.createElement('a');
var linkText = document.createTextNode("Click here to continue");
a.appendChild(linkText);
a.href = "http://phishing.com";
document.body.appendChild(a);
</SCRIPT>
```

A user new to the content of the page will possibly click the link and navigate to the phishing page. In another example arrangement, the link could be set to invisible in the web browser such that it is provided to command infected software already resident on a client browser machine, such as a bot in a botnet. Such an invisible tag will not appear to a user.

Another example of an attack based on hello.html involves by injecting code into an existing tag is shown below, causing a redirect of the web page to a phishing site once it is loaded:

```
<HTML>
<BODY onload="window.location='http://phishing.com'">
<P><B>Hello World!</B></P>
</BODY>
</HTML>
```

In the following example, we show the result of using an HTM to detect changes to characteristics of a web page to identify modification of a web page. Specifically, in the example embodiment below, the HTM is trained to model characteristics of a web page structure as opposed to the detailed web page content. This is advantageous because the structure of the webpage is much less likely to change whereas the content of the page will change frequently, especially in dynamically generated web pages. The web page is initially transformed into a web page structure format for use as input in training the HTM:

1. The structure of a web page is converted to HTML tag sequence. This is suitable because HTML tags describe a structure of a page and do not often change, even for dynamically generated pages in a web application. For example, the hello.html page can be transformed into the following sequence:
   "<HTML>"→"<BODY>"→"<P>"→"<B>"→"</B>"→"</P>"→"</BODY>"→"</HTML>"
   The HTM is trained from the web page structure reflected by such sequences. Since a web page presented to a user is based on combinations of tags and a hierarchy of tags, including nesting and relationships between tags, the HTM builds a full mapping of the tags with the relationship between them.
2. Subsequently, the HTML tag sequences and the relationship between tags are encoded into SDR for training an HTM. For example, encoding can be based on:
   a. Tag identification: e.g. <script>, <b>, <p> etc.
   b. A sequence of tags: the sequence of the Tags in the HTML page.
   c. Relationships between tags: following the logic of how tags are presented in the web page, for example: normally <B> then <P> then </P> then end with </B>.

An exemplary SDR representation for the hello.html tag sequence is provided below:

| | hello.html |
|---|---|
| Element of sequence | Encoded SDR |
| <HTML> | 0 0 0 0 0 0 1 0 1 0 0 0 0 0 0 0 0 0 0 0 0 0 0 0 0 0 0 0 0 0 1 0 0 0 0 0 1 0 0 0 0 1 0 1 0 0 0 0 0 0 0 0 0 0 0 0 0 0 0 0 0 0 0 0 0 0 0 0 0 0 0 1 0 0 0 0 0 0 0 1 0 0 0 0 0 0 0 0 0 0 0 0 0 0 0 0 0 0 0 1 1 0 0 0 |
| <BODY> | 0 0 1 0 0 0 0 0 0 1 0 0 0 0 0 0 0 0 0 0 0 0 0 0 0 0 0 0 0 1 0 0 0 0 1 0 0 0 0 1 0 0 0 0 0 0 0 0 0 0 0 0 0 0 0 0 0 0 0 0 1 0 0 0 0 0 0 0 0 0 0 0 0 0 0 0 0 0 0 0 0 0 0 0 0 0 0 0 0 0 0 1 0 0 0 1 0 0 0 0 0 1 1 |
| <P> | 0 0 0 0 0 1 0 1 0 1 0 0 0 0 0 1 0 0 0 0 0 0 0 0 0 0 0 0 0 0 0 1 0 0 0 0 0 1 0 0 0 0 0 0 0 0 0 0 0 0 0 0 0 0 0 0 0 0 0 0 0 0 0 0 0 1 0 0 0 0 0 0 0 0 0 0 0 0 0 0 0 0 0 1 0 1 0 0 0 0 0 0 0 0 0 0 0 1 0 0 0 |
| <B> | 0 0 1 0 0 0 0 0 0 0 0 0 0 0 0 0 0 1 1 0 0 0 0 0 0 0 0 0 0 0 1 0 0 0 1 0 0 0 0 0 0 1 0 0 0 0 0 0 0 0 0 0 0 0 0 0 0 0 0 0 0 0 0 0 0 1 0 0 0 0 0 0 0 0 0 1 0 0 1 0 0 0 0 0 0 0 1 |
| </B> | 1 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 1 0 0 0 0 0 0 0 0 1 0 0 0 0 1 1 0 0 1 0 1 0 0 0 0 0 0 0 0 1 0 0 0 0 0 1 0 0 0 0 0 0 0 1 0 |
| </P> | 0 0 0 0 0 0 0 0 0 0 0 0 0 0 0 0 0 0 0 0 1 0 0 0 0 0 0 0 0 1 0 0 0 0 0 0 0 1 0 0 0 0 0 1 0 0 0 1 0 0 0 0 0 1 0 0 0 0 0 1 0 0 0 0 0 1 0 1 0 0 0 0 0 0 1 1 0 0 0 0 0 0 0 0 0 0 0 0 0 0 0 0 0 |
| </BODY> | 0 0 0 0 0 0 0 0 1 0 0 0 0 0 0 0 0 0 1 0 0 0 0 1 0 0 0 0 0 0 0 0 0 0 0 1 0 1 0 0 0 0 0 0 1 0 0 0 0 0 0 0 0 0 0 0 0 0 0 0 1 0 0 0 0 0 0 0 1 0 0 0 0 0 0 0 1 0 0 0 0 0 0 0 0 0 0 1 0 0 |
| </HTML> | 0 0 0 0 0 0 0 0 0 1 0 1 0 0 0 0 0 0 0 0 0 0 0 0 0 0 0 0 0 0 0 0 0 0 0 0 0 0 1 0 0 0 0 0 0 0 |

-continued

| hello.html | |
|---|---|
| Element of sequence | Encoded SDR |
| | 0 1 1 0 0 0 0 0 0 0 0 0 1 0 0 0 1 0 0 0 0 0 0 0 0 0 0 0 0 0 1 0 0 0 0 0 0 0 1 0 0 0 0 0 0 0 0 0 0 0 0 0 1 0 |

Such an SDR representation is used to train the HTM to generate an HTM model of characteristics of web page(s) for a web application and, subsequently, in an inference mode of operation of the HTM model to identify anomalies indicating changes to such characteristics.

Considering now container traffic, a similar approach can be applied albeit to traffic for the container 296 and not restricted to traffic for the particular application 298. For example, the Docker container environment provides a REST API interface for querying details of a container 296 at runtime. Information provided by such an interface can include network information such as is shown in the exemplary Docker information below:

```
HTTP/1.1 200 OK
    Content-Type: application/json
    {
        "read" : "2015-01-08T22:57:31.547920715Z",
        "networks": {
            "eth0": {
                "rx_bytes": 5338,
                "rx_dropped": 0,
                "rx_errors": 0,
                "rx_packets": 36,
                "tx_bytes": 648,
                "tx_dropped": 0,
                "tx_errors": 0,
                "tx_packets": 8
            },
            "eth5": {
                "rx_bytes": 4641,
                "rx_dropped": 0,
                "rx_errors": 0,
                "rx_packets": 26,
                "tx_bytes": 690,
                "tx_dropped": 0,
                "tx_errors": 0,
                "tx_packets": 9
            }
    ...
```

Thus, it can be seen that container network information can be obtained including transmit, receive, packet, error and volume information. Taken temporally, such information can be constituted as a set of container network traffic records for training an HTM as previously described.

Further, the set of container resource records can include information relating to the use of resources by a container 296. For example, the Docker container environment can readily provide docker statistics for a deployed container thus:

| $ docker stats | | | | | |
|---|---|---|---|---|---|
| CONTAINER | CPU % | MEM USAGE/LIMIT | MEM % | NET I/O | BLOCK I/O |
| 1285939c1fd3 | 0.07% | 796 KiB/64 MiB | 1.21% | 788 B/648 B | 3.568 MB/512 KB |
| 9c76f7834ae2 | 0.07% | 2.746 MiB/64 MiB | 4.29% | 1.266 KB/648 B | 12.4 MB/0 B |
| d1ea048f04e4 | 0.03% | 4.583 MiB/64 MiB | 6.30% | 2.854 KB/648 B | 27.7 MB/0 B |

Accordingly, the CPU, memory usage, network and storage input/output can be retrieved at a point in time for a particular container. Furthermore, the aforementioned REST API provided by, for example, Docker, can provide further status insight such as:

```
HTTP/1.1 200 OK
    Content-Type: application/json
    {
        "read" : "2015-01-08T22:57:31.547920715Z",
        ...
        "memory stats" : {
            "stats" : {
                "total_pgmajfault" : 0,
                "cache" : 0,
                "mapped_file" : 0,
                "total_inactive_file" : 0,
                "pgpgout" : 414,
                "rss" : 6537216,
                "total_mapped_file" : 0,
                "writeback" : 0,
                "unevictable" : 0,
                "pgpgin" : 477,
                "total_unevictable" : 0,
                "pgmajfault" : 0,
                "total_rss" : 6537216,
                "total_rss_huge" : 6291456,
                "total_writeback" : 0,
                "total_inactive_anon" : 0,
                "rss_huge" : 6291456,
                "hierarchical_memory_limit" : 67108864,
                "total_pgfault" : 964,
                "total_active_file" : 0,
                "active_anon" : 6537216,
                "total_active_anon" : 6537216,
                "total_pgpgout" : 414,
                "total_cache" : 0,
                "inactive_anon" : 0,
                "active_file" : 0,
                "pgfault" : 964,
                "inactive_file" : 0,
                "total_pgpgin" : 477
            },
            "max_usage" : 6651904,
            "usage" : 6537216,
            "failcnt" : 0,
            "limit" : 67108864
        },
        "blkio_stats" : { },
        "cpu_stats" : {
            "cpu_usage" : {
                "percpu_usage" : [
                    8646879,
                    24472255,
                    36438778,
                    30657443
                ],
                "usage_in_usermode" : 50000000,
                "total_usage" : 100215355,
                "usage_in_kernelmode" : 30000000
            },
            "system_cpu_usage" : 739306590000000,
            "throttling_data" :
{"periods":0,"throttled_periods":0,"throttled_time":0}
        },
        "precpu_stats" : {
```

```
            "cpu_usage" : {
                "percpu_usage" : [
                    8646879,
                    24350896,
                    36438778,
                    30657443
                ],
                "usage_in_usermode" : 50000000,
                "total_usage" : 100093996,
                "usage_in_kernelmode" : 30000000
            },
            "system_cpu_usage" : 9492140000000,
            "throttling_data" :
{"periods":0,"throttled_periods":0,"throttled_time":0}
        }
    }
```

Thus it can be seen that detailed container resource information can be obtained for a deployed container 296 to constitute a set of container resource records for training an HTM as previously described.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to detect anomalous behavior of a software container having a software application executing therein, the method comprising:
  receiving a sparse data representation of each of:
    a first set of container network traffic records,
    a first set of application traffic records, and
    a first set of container resource records,
    and training a first hierarchical temporal memory (HTM) for the first set of container network traffic records, a second HTM for the first set of application traffic records, and a third HTM for the first set of container resource records, wherein the first set of container network traffic records correspond to network traffic communicated with the software container, the first set of application traffic records correspond to network traffic communicated with the software application, and the first set of container resource records correspond to the use of computer resources by the software container;
  receiving a sparse data representation of each of:
    a second set of container network traffic records,
    a second set of application traffic records, and
    a second set of container resource records;
  executing the trained first HTM based on the second set of container network traffic records, the trained second HTM based on the second set of application traffic records, and the trained third HTM based on the second set of container resource records to determine a degree of recognition of each of the second set of container network traffic records, the second set of application traffic records, and the second set of container resource records; and
  responsive to an identification of a coincidence of a degree of recognition of each of the second set of container network traffic records, the second set of application traffic records, and the second set of container resource records being below a threshold degree in each of the trained first HTM, the trained second HTM, and the trained third HTM, identifying anomalous behavior of the software container.

2. The method of claim 1, wherein the software container is a software process executable in an operating system of a computer system in which operating system software processes are prevented from accessing resources of other second processes executing in the operating system.

3. The method of claim 1, wherein, in response to the identification of anomalous behavior, implementing a responsive measure to the anomalous behavior.

4. The method of claim 3, wherein the responsive measure includes one or more of: interrupting operation of the software container; identifying software components in communication with the application in the software container as potentially compromised; identifying a definition of the software container as anomalous; and effecting at least one of a redeployment, a reinstallation or a reconfiguration of the software container.

5. The method of claim 1, wherein, in the training mode of operation, each HTM evaluates an anomaly score for records in a respective first set of records and the HTM is trained until the anomaly score meets a predetermined threshold degree of anomaly.

6. The method of claim 1, wherein the coincidence occurs within a time window having a predetermined maximum duration.

7. A computer system comprising:
a processor and memory storing computer program code for detecting anomalous behavior of a software container having a software application executing therein, by:
  receiving a sparse data representation of each of:
    a first set of container network traffic records,
    a first set of application traffic records, and
    a first set of container resource records,
  and training a first hierarchical temporal memory (HTM) for the first set of container network traffic records, a second HTM for the first set of application traffic records, and a third HTM for the first set of container resource records, wherein the first set of container network traffic records correspond to network traffic communicated with the software container, the first set of application traffic records correspond to network traffic communicated with the software application, and the first set of container resource records correspond to the use of computer resources by the software container;
  receiving a sparse data representation of each of:
    a second set of container network traffic records,
    a second set of application traffic records, and
    a second set of container resource records;
  executing the trained first HTM based on the second set of container network traffic records, the trained second HTM based on the second set of application traffic records, and the trained third HTM based on the second set of container resource records to determine a degree of recognition of each of the second set of container network traffic records, the second set of application traffic records, and the second set of container resource records; and
  responsive to an identification of a coincidence of a degree of recognition of each of the second set of container network traffic records, the second set of application traffic records, and the second set of container resource records being below a threshold degree in each of the trained first HTM, the trained second HTM, and the trained third HTM, identifying anomalous behavior of the software container.

8. A non-transitory computer readable storage element comprising computer program code to, when loaded into a computer system and executed thereon, cause the computer system to perform the method as claimed in claim 1.

\* \* \* \* \*